United States Patent
Enquist

(10) Patent No.: US 8,689,611 B2
(45) Date of Patent: Apr. 8, 2014

(54) LEAK DETECTION SYSTEM COMPRISING A TRACER GAS MEDIATING UNIT

(75) Inventor: Fredrik Enquist, Linköping (SE)

(73) Assignee: Inficon AB, Linköping (SE)

( * ) Notice: Subject to any disclaimer, the term of this patent is extended or adjusted under 35 U.S.C. 154(b) by 694 days.

(21) Appl. No.: 12/738,223

(22) PCT Filed: Oct. 15, 2007

(86) PCT No.: PCT/SE2007/050741
§ 371 (c)(1),
(2), (4) Date: Jul. 20, 2010

(87) PCT Pub. No.: WO2009/051530
PCT Pub. Date: Apr. 23, 2009

(65) Prior Publication Data
US 2010/0288020 A1    Nov. 18, 2010

(51) Int. Cl.
*G01M 3/04* (2006.01)
(52) U.S. Cl.
USPC ............................................................ 73/40.7
(58) Field of Classification Search
USPC ............................................................ 73/40.7
See application file for complete search history.

(56) References Cited

U.S. PATENT DOCUMENTS

| | | | |
|---|---|---|---|
| 5,099,437 A | 3/1992 | Weber | |
| 5,356,594 A | 10/1994 | Neel et al. | |
| 6,362,741 B1 | 3/2002 | Hickox et al. | |
| 6,907,771 B2 * | 6/2005 | Finlay et al. | 73/40.7 |
| 7,628,532 B2 * | 12/2009 | Wardlaw | 374/4 |
| 2007/0212792 A1 | 9/2007 | Havens et al. | |
| 2007/0240493 A1 * | 10/2007 | Conlan et al. | 73/40.7 |

FOREIGN PATENT DOCUMENTS

| | | |
|---|---|---|
| JP | 2007 192748 A | 8/2007 |
| WO | WO-2006/069877 A1 | 7/2006 |

OTHER PUBLICATIONS

Supplementary European Search Report, dated Nov. 10, 2011, issued in connection with counterpart European Patent Application No. EP 07 83 5326.
PCT/ISA/210—International Search Report—May 13, 2008.
Communication pursuant to Article 94(e) EPC from the European Patent Office, dated Jan. 7, 2013, issued in connection with counterpart European Application No. 07 835 326.5.

* cited by examiner

*Primary Examiner* — Hezron E Williams
*Assistant Examiner* — Rodney T Frank
(74) *Attorney, Agent, or Firm* — Venable LLP; Eric J. Franklin

(57) ABSTRACT

A system for detection of a leak at a leakage testing point of a test object by a tracer gas. A positionable tracer gas mediating unit has a tip. A marker is attachable at the leakage testing point. A marker detector is associated with the positionable tracer gas mediating unit. The tip of the tracer gas mediating unit is arranged to be positioned within a predetermined distance interval from the marker during a leak detection test. The marker detector is arranged to detect the marker when the tip is positioned within the predetermined distance interval so as to certify a correct positioning of the tip.

10 Claims, 2 Drawing Sheets

LEAK DETECTION SYSTEM COMPRISING A TRACER GAS MEDIATING UNIT

CROSS-REFERENCE TO RELATED APPLICATIONS

This application is the national phase under 35 U.S.C. §371 of PCT/SE2007/050741 filed 15 Oct. 2007.

TECHNICAL FIELD

The present invention relates to a system for detection of a leak at a leakage testing point of a test object by means of a tracer gas, which system comprises a positionable tracer gas mediating unit having a tip.

BACKGROUND OF THE INVENTION

The leak tightness of an object may be necessary or desired to determine for different reasons. For example, it may be necessary to test the leak tightness of a product in order to guarantee a certain quality of the product, or to test the leak tightness of a product or industrial facilities due to environmental concern. Typical examples of products required to be tested for leakage are parts of refrigeration systems for industrial, commercial, domestic and automotive use as well as liquid and gas carrying parts in the automotive industry, such as for example fuel tanks and aluminium wheels.

Today there are many known systems and methods for performing leak testing of an object. Some of them are based on tracer gas techniques, whereby the presence of a tracer gas is utilized for detecting leaks. The tracer gas, or a gas mixture comprising the tracer gas, is then detected after leak passage by means of a detecting instrument. Examples of commonly utilized tracer gases are helium, hydrogen, refrigerants, sulfur hexafluoride and carbon dioxide.

One tracer gas method for performing leak testing of an object is the so-called sniffing method. In the sniffing method, the test object is pressurized with a tracer gas. Tracer gas leaking out of the object is detected by tracer gas detecting equipment comprising a sniffer probe with a sniffer tip and a tracer gas sensor. The sniffer probe picks up any tracer gas that has leaked out of the test object by means of the sniffer tip and mediates the tracer gas to the tracer gas sensor.

Another tracer gas method for performing leak testing of an object is the so-called spraying method. In the spraying method, the test object is under vacuum and the interior of the test object is connected to a tracer gas detecting equipment comprising a tracer gas sensor. Tracer gas is sprayed onto the test object on the outside thereof by means of a tracer gas spraying device with a spraying tip, i.e. tracer gas is mediated from a tracer gas source by means of the spraying tip onto the outside of the test object. Any tracer gas that enters the test object is then detected by means of the tracer gas detecting equipment.

Both the sniffing method and the spraying method may be applied for local leak detection, i.e. leak detection at a specific leakage testing point. Local leak detection may also be called pin pointing. In local leak detection, the sniffer tip and the spraying tip, respectively, are positioned at a leakage testing point of the object in order to test the leak tightness of that specific leakage testing point. However, in order for the sniffing method and the spraying method, respectively, to be reliable when they are applied for local leak detection, the sniffer tip and the spraying tip, respectively, have to be positioned within a predetermined distance interval from the leakage testing point. In case a sniffer tip or spraying tip, respectively, is not positioned within the correct distance interval from the leakage testing point, the tip might not be able to pick up or spray, respectively, the tracer gas in a correct way. Incorrect test results may then be obtained. The tested objected may then be determined as leak tight in spite of the fact that there is a leak or may be determined as having a smaller leak than it actually has. Thus, the test object may then be determined to be "OK" even though it is not according to the requirements of the test.

The predetermined distance interval depends on the many different factors. For example, it depends on properties of the utilized tracer gas, and the sensitivity of the sensor and/or the detecting equipment for the actual tracer gas. In addition, the predetermined distance interval depends on which size of leaks that it is desired to detect. If it is desired to detect small leaks of a test object, the predetermined distance interval is shorter than if it is desired to detect larger leaks of the test object.

One way to avoid the risk of placing the sniffer tip and the spraying tip, respectively, at an incorrect distance from the leakage testing point is to perform a so-called global leak detection instead of a local leak detection. Both the sniffing method and the spraying method may be applied for global leak detection. In global leak detection, the test object is placed in a cabinet or test chamber, whereby it is tested whether the test object is leaking at any point or is leak tight, i.e. it is not tested whether there is a leak at a specific testing point, but the "total" leakage of the test object is tested. In case the sniffing method is utilized, the sniffer tip is positioned in the test chamber and any increase of the tracer gas concentration in the test chamber is detected. In case the spraying method is utilized, the spraying tip sprays tracer gas into the test chamber in order to surround the complete test object and any increase of the tracer gas concentration in the test object is detected. However, the global leak detection is not suitable to utilize for all types of test objects. More specifically, it is neither efficient nor cost effective when the test object is complex or has such dimensions that it is necessary to utilize a big or complex test chamber. Since many test objects have a complex design, local leak detection is commonly utilized.

One device which may be utilized in local leak detection and which comprises means for avoiding the risk of placing a sniffer tip at an incorrect distance from a test object is described in WO 2006/069877. More specifically, WO 2006/069877 describes a leak detector comprising a sniffer probe with a sniffer tip. The sniffer probe is provided with a distance detector for determining the distance between the sniffer tip and a test object. A leak detection test is only initiated if the distance between the sniffer tip and the test object corresponds to a predetermined value, whereby measurement errors due to placement of the sniffer tip at an incorrect distance from the test object are avoided. In a preferred embodiment, the distance detector is an optical detector, which comprises a light emitting device and a light receiving device. The light emitting device projects light onto a point on the test object and the light receiving device measures the intensity of the reflected light, whereby the distance between the sniffer tip and the test object is determined.

Thus, the leak detector described in WO 2006/069877 may be utilized to assure that the sniffer tip is positioned at a correct distance from the test object during a leak detection test. However, it may only be utilized to assure that the sniffer tip is positioned within a correct distance from the test object, not to assure that the sniffer tip is directed towards the correct testing point. This means that when the leak detector described in WO 2006/069877 is utilized, any point on the test object may be interpreted as the correct testing point if the distance between the point and the sniffer tip is correct. In other words, when utilizing the leak detector described in WO 2006/069877 the operator may direct the sniffer tip towards a point on the test object which is thought to be the correct testing point, but which is not. Then the leak test is performed at a correct distance from the test object, but at an erroneous point on the test object. The fact that an operator may direct the sniffer tip towards an erroneous point on the test object may be due to various facts. For example, many test objects are complex and many leakage test procedures are performed under poor lighting, whereby it may be difficult to see the intended testing point.

In view of the above, utilization of the leak detector described in WO 2006/069877 implies that the operator knows exactly where the leakage testing point is located on the test object and that the operator directs the sniffer tip towards that point. It is, thus, highly operator dependent, i.e. it is dependent on the behavior of the operator. In addition, the utilization of the leak detector described in WO 2006/069877 is also dependent on the properties of the surface of the test object.

Thus, there is still a need for a system for detection of a leak at a leakage testing point (i.e. which may be utilized for local leak detection), whereby the above mentioned drawbacks are avoided.

SUMMARY OF THE INVENTION

Accordingly, one object of the present invention is to provide an improved system for detection of a leak at a leakage testing point of a test object by means of a tracer gas, which system comprises a positionable tracer gas mediating unit having a tip.

Still other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures described herein.

BRIEF DESCRIPTION OF THE DRAWINGS

In the drawings, wherein like reference characters denote similar elements throughout the several views.

DETAILED DESCRIPTION OF PREFERRED EMBODIMENTS

The present invention provides a system that may be utilized for detection of a leak at a leakage testing point of a test object by means of a tracer gas, i.e. it may be utilized for local leak detection as above described. The term "leakage testing point" is herein intended to mean a point on an object at which leakage is intended to be tested. The term "test object" is herein intended to mean an object which is intended to be tested for leakage and may be, for example, a product or an installation. Examples of products that may be tested for leakage by means of the system according to the invention are parts of refrigeration systems for industrial, commercial, domestic and automotive use as well as liquid and gas carrying parts in the automotive industry, such as for example fuel tanks and aluminium wheels. The term "tracer gas" is herein intended to mean a gas that is utilized to detect a leak on a test object, i.e. a gas which is detected after leak passage. The tracer gas may be a gas that is only utilized for test purposes, i.e. a gas that is applied to the test object only in order to detect any leak, or may be a gas that is a normal component of the test object. For example, the tracer gas may be helium, hydrogen, refrigerants, sulfur hexafluoride or carbon dioxide. The term "tracer gas mediating unit" is herein intended to mean a unit that mediates tracer gas from the outside thereof into the interior of the unit, or a unit that mediates tracer gas from its interior to the outside thereof. More specifically, the term "tracer gas mediating unit" is herein intended to mean a sniffer probe or a tracer gas spraying device. The sniffer probe mediates tracer gas from the outside thereof, i.e. from the outside of a test object, into the interior of the sniffer probe. The tracer gas spraying device mediates tracer gas from its interior to the outside of the spraying device, i.e. to the outside of a test object. In some embodiments of the system according to the invention, it is designed to be utilized in the above described sniffing method and in other embodiments it is designed to be utilized in the above described spraying method. Different embodiments of the system according to the invention will now be described in more detail with reference to the drawings.

Figure 1:
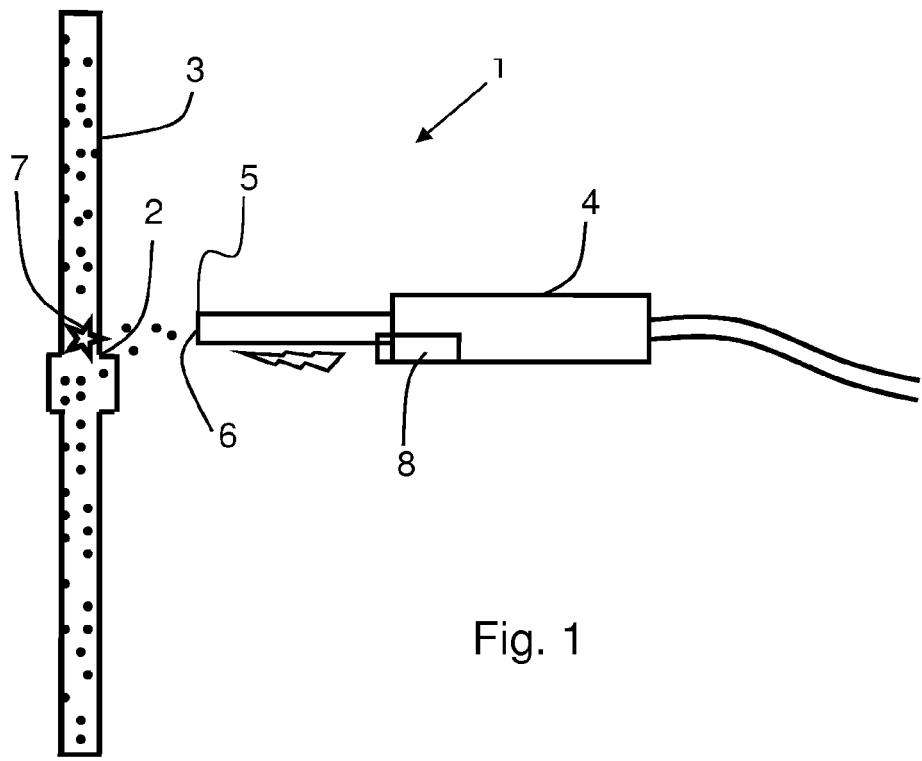
FIG. 1 shows a schematic view of a first embodiment of a system according to the invention applied on a test object.

FIG. 1 shows a schematic view of a first embodiment of a system 1 according to the invention, by which a leak at a leakage testing point 2 of a test object 3 may be detected by means of a tracer gas. The first embodiment of the system 1 is designed to be utilized in the sniffing method and comprises a sniffer probe 4 having a sniffer tip 5. As shown in FIG. 1, the sniffer probe 4 may have a gun-like design. However, it may have any suitable shape. Tracer gas is schematically illustrated in FIG. 1 in the form of dots.

As above described, the test object 3 is pressurized with a tracer gas in the sniffing method and tracer gas leaking out of the test object 3 is detected. The sniffer probe 4 is arranged to pick up any tracer gas that has leaked out of the test object 3 by means of the sniffer tip 5. More specifically, the sniffer tip 5 comprises a gas inlet orifice 6 arranged to mediate tracer gas from the outside of the test object 3 into the interior of the sniffer probe 4. Furthermore, the sniffer probe 4 is arranged to mediate the tracer gas not only to the interior of the sniffer probe 4, but also to a tracer gas sensor (not shown in FIG. 1). The tracer gas sensor may be located in the sniffer probe 4 or within a separate unit to which the sniffer probe 4 is connectable. In case the tracer gas sensor is located in the sniffer probe 4, it may either be located at the sniffer tip 5 or in the remainder of the sniffer probe 4. Due to its tracer gas mediating properties, the sniffer probe 4 is herein denoted as a tracer gas mediating unit.

Furthermore, the sniffer probe 4 is positionable, i.e. it may be moved in order to position the sniffer tip 5 at a certain location in relation to the test object 3. The sniffer probe 4 may be a hand-held unit intended to be manually operated or may be a unit intended to be attached to and manipulated by a robot.

The system 1 according to the first embodiment of the invention comprises further a marker 7, which is attachable at the leakage testing point 2 of the test object 3. For purposes of illustration, the marker 7 is shown as star-shaped. However, it may have any suitable shape. The marker 7 is intended to be utilized for marking the location of the leakage testing point 2, i.e. it is intended to be utilized as a guide to where the leakage testing point 2 is located. Thus, the marker 7 may be intended to be attached on the test object 3 as close to the leakage testing point 2 as possible without disturbing any leakage of tracer gas from the interior of the test object 3 to the outside thereof. Furthermore, the marker 7 may be positioned at the leakage testing point 2 during manufacture of the test object 3, or after manufacture of the test object 3 but before leak detection. In case the test object 3 comprises two components that are to be assembled, such as two tube components, the marker 7 may either be attached to one of the components after the assembly at an assembly zone or may be attached to one of the components before the assembly at a part intended to be positioned in an assembly zone.

In an alternative, the marker 7 may be intended to be attached on a fixture instead of on the test object. The marker 7 is then intended to be attached on the fixture as close to the leakage testing point 2 as possible without disturbing any leakage of tracer gas from the interior of the test object 3 to the outside thereof. This will be further described below.

In addition, the system 1 according to the first embodiment of the invention comprises a marker detector 8, which is associated with the sniffer probe 4. As shown in FIG. 1, the marker detector 8 may be positioned on the outside of the sniffer probe 4. Alternatively, the marker detector 8 may be positioned within the sniffer probe 4, i.e. either at the sniffer tip 5 or within the remainder of the sniffer probe 4.

Furthermore, the sniffer tip 5 is arranged to be positioned within a predetermined distance interval from the marker 7 during a leak detection test in order to provide reliable test results. In order to certify a correct positioning of the sniffer tip 5 within the predetermined distance interval, the marker detector 8 is arranged to detect the marker 7 when the sniffer tip 5 is positioned within the predetermined distance interval.

For example, the marker detector 8 may generate a signal when the sniffer tip 5 is positioned within the predetermined distance interval or may be connected to a signal generator which generates a signal when the sniffer tip 5 is positioned within the predetermined distance interval. The generated signal may be utilized to alert the user, or the robot, that the sniffer tip 5 is correctly positioned in order to start a test. Alternatively, the generated signal may be required in order for the system 1 to be able to start a test.

Thus, by means of the marker 7 and the marker detector 8 of the system 1 according to the invention, it may be assured that the sniffer tip 5 is positioned within a certain predetermined distance interval from the marker 7. Since the marker 7 is intended to be attached as close to the leakage testing point 2 as possible, it may thereby be assured that the sniffer tip 5 is positioned within a specific distance interval from the leakage testing point 2.

As mentioned above, the sniffer tip 5 has to be positioned within a specific distance interval from the leakage testing point 2 in order for the leak detection to be reliable. In case the sniffer tip 5 is not positioned within a specific distance interval from the leakage testing point 2, incorrect results of a leak test may be obtained. According to the above, this may be avoided by means of the marker 7 and marker detector 8 according to the invention.

The detection of the marker 7 by the marker detector 8 may be based on any suitable physical principle. The marker 7 and the marker detector 8 may be of any suitable types for the application according to the invention. However, the marker 7 must be possible to attach on the test object 3 close to the leakage testing point 2. Alternatively, the marker 7 must be possible to attach on a fixture close to the leakage measurement point 2. The marker detector 8 must be able to detect the marker 7 when the sniffer tip 5 is positioned within the predetermined distance interval.

For example, the marker 7 may comprise a radio frequency (RF) tag, a radio frequency identification (RFID) tag, a light reflecting component or a magnetic ink.

RFID is a known technology in which the electromagnetic or electrostatic coupling in the RF portion of the electromagnetic spectrum is used to transmit signals. An RFID tag comprises typically a device, e.g. a microchip, which stores information. For example, the microchip may include a unique serial number, but it may also include other information. A reader, or interrogator, communicates with the RFID tag through radio waves. The microchip is attached to an antenna that receives signals from and sends signals to the interrogator. Furthermore, RFID tags can be active tags, passive tags or semi-passive tags. Active tags include a power source that powers the microchip's circuitry and transmits a signal to the interrogator. Passive tags do not include a power source. Passive tags draw the power required for the circuitry and the transmission of information from the electromagnetic field generated by the interrogator. Semi-passive tags are similar to active tags; however the power source is used to run the microchip's circuitry, but not to communicate with the interrogator.

In case the marker 7 comprises an RF tag or an RFID tag, the marker detector 8 comprises a reader which is arranged to detect the tag based on radio waves, i.e. it communicates with the tag through radio waves. Furthermore, the RFID tag may be an active tag, a passive tag or a semi-passive tag. For example, the RFID tag may be any one of the known RFID tags that may be utilized for identity determination. The tags may be configured to only provide a response to the reader when the reader is positioned within an appropriate distance range from the tag. Thus, in case the marker 7 comprises an RF tag or an RFID tag and the marker detector 8 is a reader for such a tag, the tag may be configured to only provide a response to the marker detector 8 when the marker detector 8 is positioned within a certain distance range from the tag. Thereby, the marker detector 8 may be arranged to detect the tag when it is positioned within the certain distance range from the tag. By adapting that certain distance range to the predetermined distance interval, in which the sniffer tip 5 is arranged to be positioned during a leak detection test, the marker detector 8 may be arranged to detect the tag when the sniffer tip 5 is positioned within the predetermined distance interval.

As mentioned above, the marker 7 may alternatively comprise a light reflecting component. The light reflecting component is then a component having light reflecting properties, which substantially differ from the light reflecting properties of the surface of the test object 3 in at least an area around the leakage testing point 2.

In case the marker 7 comprises a light reflecting component, the marker detector 8 comprises a light emitting device and a light receiving device. Any known suitable light emitting and light receiving devices for distance measurements based on measurement of the intensity of reflected light may be utilized. For example, the light emitting device may be a laser source, such as e.g. a pulsed laser. The light receiving device may then be a photo detector. By measuring the distance between the marker detector 8 and the light reflecting component based on light reflection, the distance between the sniffer tip 5 and the light reflecting component may, thus, be determined. Thereby, the marker detector 8 may be configured to only detect the marker 7 when the sniffer tip 5 is positioned within the predetermined distance interval from the marker 7.

In a further alternative, the marker 7 comprises a magnetic ink. Then the marker detector 8 comprises a magnetic ink reader, which is arranged to detect the magnetic ink based on magnetic field intensity. Any known suitable magnetic ink and magnetic ink reader may be utilized. By measuring the magnetic field intensity, which corresponds to a certain distance between the magnetic ink reader and the magnetic ink, the distance between sniffer tip 5 and the magnetic ink may, thus, be determined. Thereby, the marker detector 8 may be configured to only detect the magnetic ink, i.e. the marker, when the sniffer tip 5 is positioned within the predetermined distance interval from the marker 7.

Optionally, the marker 7 may further comprise means for recording the result of the test in the marker 7. Then the test result is immediately associated with the marker 7 and, thus, the leakage testing point 2. Furthermore, the test result may then be stored for later utilization and there is then no risk of mixing the test results for different leakage testing points with each other.

Furthermore, in case the marker 7 comprises identifying information, i.e. unique information identifying the marker, the test result may be immediately associated with the identifying information. This may either be achieved by storing the test result in the marker, or by recording the test result together with the identity information in a recording unit to which the sniffer probe 4 is connectable. For example, RFID tags comprise identity information.

In a further alternative, the marker 7 comprises a first component, which may be detected by the marker detector 8 for certifying the correct positioning of the sniffer tip 5, and a second component comprising identity information. The first component may then be an RF tag, an RFID tag, a light reflecting component or a magnetic ink, and the second component may then be an RFID tag. Optionally, the system 1 may then also comprise means for reading the identity information.

Furthermore, the marker 7 and the marker detector 8 of the system 1 according to the invention enable not only the assurance that the sniffer tip 5 is positioned within a certain distance interval from the leakage testing point, but also that the leak detection really is performed at the intended leakage testing point. By means of the marker 7, which is intended to be positioned as close to the leakage testing point 2 as possible, and the marker detector 8, it may be assured that the sniffer tip 5 is directed towards the correct point on the test object 3 and that the sniffer tip 5 is positioned within the predetermined distance interval from that point during a leak detection test. If the sniffer tip 5 is not directed towards the correct point and/or if the sniffer tip 5 is not positioned within the correct distance interval from that point, the marker 7 is not detected, whereby the operator knows that the sniffer tip 5 is not correctly positioned. In addition, the system may be configured such that a test is not possible to perform without correct positioning. Thereby, the operator dependency is substantially reduced. Furthermore, the system allows control of the work performed by an operator.

Furthermore, by means of the marker 7 and the marker detector 8, the leakage testing point 2 is automatically identified and it is automatically assured that the sniffer tip 5 is positioned within a specific distance interval from the leakage testing point 2, i.e. the system itself identifies the leakage testing point and the positioning of the sniffer tip within the correct distance interval. This may also imply that the time required for leak testing of the test object 3 is substantially reduced.

Figure 2:
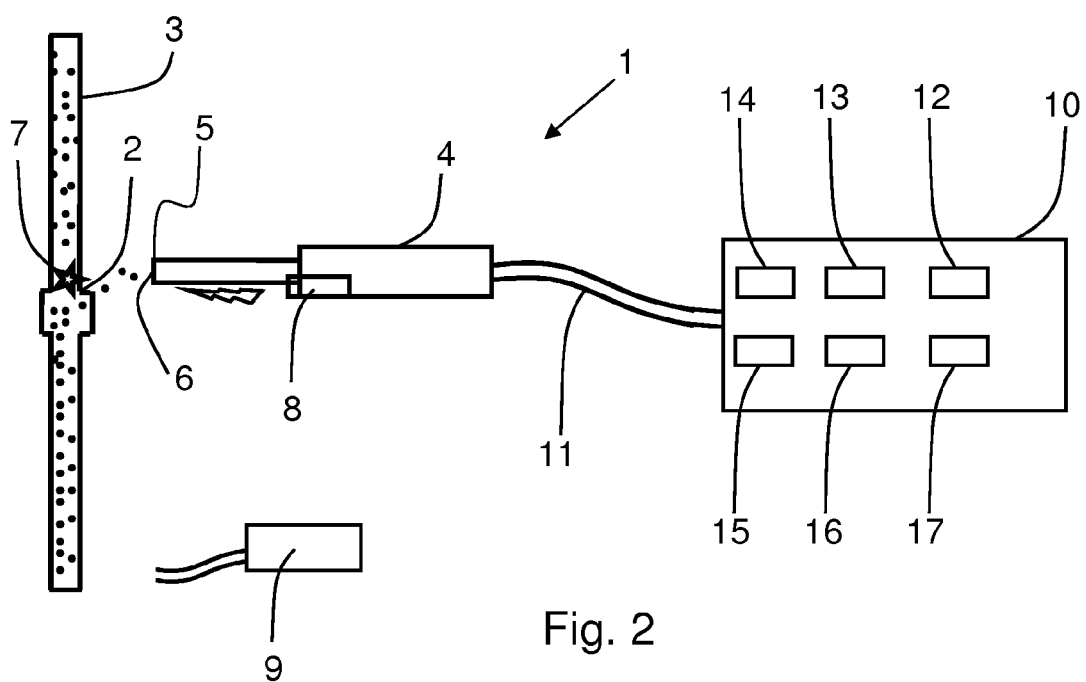
FIG. 2 shows a schematic view of a second embodiment of the system according to the invention applied on a test object.

FIG. 2 shows a schematic view of a second embodiment of the system 1 according to the invention, which comprises the sniffer probe 4, the marker 7 and the marker detector 8 of the first embodiment of the system 1. However, the second embodiment of the system 1 comprises further a tracer gas supplying device 9, which is arranged to be utilized for supplying tracer gas into the test object 3 in order to pressurize the test object 3 therewith. The tracer gas supplying device 9 may comprise at least one component from the group of a tracer gas source, a gas controller, a gas pressure regulator and means for connecting the tracer gas source to the test object 3. The tracer gas source is arranged to constitute a source of tracer gas and may be of any suitable type. The gas controller is arranged to administrate the filling of tracer gas from the tracer gas source into the test object 3 and may be of any suitable type. The gas pressure regulator is arranged to control the output pressure from the tracer gas source and may be of any suitable type.

Furthermore, the second embodiment of the system 1 comprises a base unit 10 to which the sniffer probe 4 is connectable by means of a connection line 11. The connection line 11 is flexible in order to enable movement of the sniffer probe 4 in relation to the base unit 10.

In the second embodiment of the system 1, the base unit 10 comprises a vacuum pump 12, which is arranged to provide a vacuum so as to provide that gas is sucked in at the gas inlet orifice 6. Furthermore, the base unit 10 comprises a tracer gas sensor 13, to which gas is mediated from the gas inlet orifice 6 and which is arranged to selectively detect the utilized tracer gas. For example, the tracer gas sensor 13 may be an infrared gas analyzer, a hydrogen gas sensitive sensor or a mass spectrometer. Instead of being positioned in the base unit 10, the tracer gas sensor 13 may alternatively may be positioned within the sniffer probe 4.

In addition, the base unit 10 comprises a tracer gas measuring unit 14, which is arranged to measure and interpret signals from the tracer gas sensor 13, and a time measuring unit 15, which is arranged to measure the time the sniffer tip 5 is positioned within the predetermined distance interval from the marker 7 during a test. The time measuring unit 15 may further be arranged to either alert the user by a signal when the sniffer tip 5 has been positioned within the predetermined distance interval from the marker 7 during a predetermined time or to interrupt the test when such time has lapsed.

The base unit 10 comprises further a marker counting unit 16, which is arranged to count the number of leakage testing points tested, and a test result recording unit 17, which is 20 arranged to store test results, i.e. to store measurements of the amount of tracer gas that has leaked out of the test object 3 at the leakage testing point 2. Optionally, it may also be arranged to store the measurement time and the number of leakage testing points tested. In case the markers 7 comprise an identity, the identity may be stored together with the measurement results and the measurement time.

Optionally, the system 1 may further comprise a suction flow generating unit (not shown) arranged to generate a suction flow from the sniffer tip 5 to the tracer gas sensor 13.

Furthermore, the system 1 may further comprise a leak rate limit setting unit (not shown) by which a leak rate limit for a leakage testing point may be set, i.e. by which a limit may be set for when the leakage is acceptable or not.

In addition, the system 1 may optionally comprise a fixture for the test object and a fixture controller (not shown). The fixture for the test object is arranged to be connected to the test object for filling and removing gas as well as to seal any other openings not constituting leakage testing points. The fixture controller is arranged to maneuver the connections and seals of the fixture. In case the system 1 comprises a fixture, the marker 7 may either be arranged to be attached on the test object 3 or on the fixture at the leakage testing point 2. Optionally the fixture may then be provided with a special component, such as e.g. an arm or the like, for holding the marker 7 close to the leakage measurement point 2, i.e. at the leakage testing point 2.

In alternatives to the second embodiment, the system 1 comprises the sniffer probe 4, the marker 7, the marker detector 8 and at least component from the group of the tracer gas supplying device 9, the vacuum pump 12, the tracer gas sensor 13, the tracer gas measuring unit 14, the time measuring device 15, the marker counting unit 16, the test result recording unit 17, the suction flow generating unit, the leak rate limit setting unit, the fixture and the fixture controller.

Figure 3:
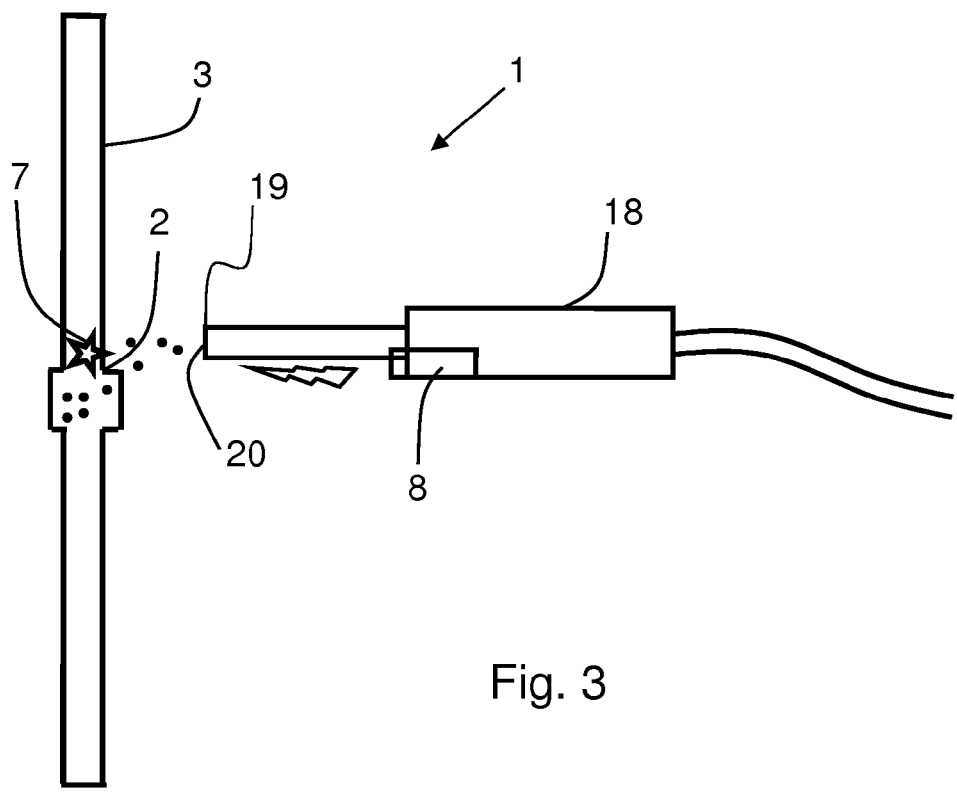
FIG. 3 shows a schematic view of a third embodiment of the system according to the invention applied on a test object.

FIG. 3 shows a schematic view of a third embodiment of the system 1 according to the invention. The third embodiment of the system 1 is designed to be utilized in the above described spraying method and comprises a tracer gas spraying device 18 having a spraying tip 19. Tracer gas is schematically illustrated in FIG. 3 in the form of dots.

As above described, the test object 3 is under vacuum in the sniffing method and tracer gas leaking into the test object 3 is detected. The tracer gas spraying device 18 is arranged to spray tracer gas onto the test object 3 by means of the spraying tip 19. More specifically, the spraying tip 19 comprises a gas outlet orifice 20 arranged to mediate tracer gas from the interior of the tracer gas spraying device 18 onto the test object 3. The spraying device 18 may comprise a tracer gas source or may be connectable to a separate tracer gas source. Due to its tracer gas mediating properties, the spraying device 18 is herein denoted as a tracer gas mediating device.

Furthermore, the tracer gas spraying device 18 is positionable, i.e. it may be moved in order to position the spraying tip 19 at a certain location in relation to the test object 3. The spraying device 18 may be a hand-held unit intended to be manually operated or may be a unit intended to be attached to and manipulated by a robot.

The third embodiment of the system 1 according to the invention comprises the marker 7 and the marker detector 8, which corresponds to the marker 7 and marker detector 8, respectively, in the first and second embodiments. The marker 7 may either be arranged to be attached on the test object 3 or on a fixture close to the leakage testing point. The marker detector 8 may be positioned either on the outside of the spraying device 18 or within the spraying device 18.

The spraying tip 19 is arranged to be positioned within a predetermined distance interval from the marker 7 during a leak detection test in order to provide reliable test results. In order to certify a correct positioning of the spraying tip 19 within the predetermined distance interval, the marker detector 8 is arranged to detect the marker 7 when the spraying tip 19 is positioned within the predetermined distance interval.

Figure 4:
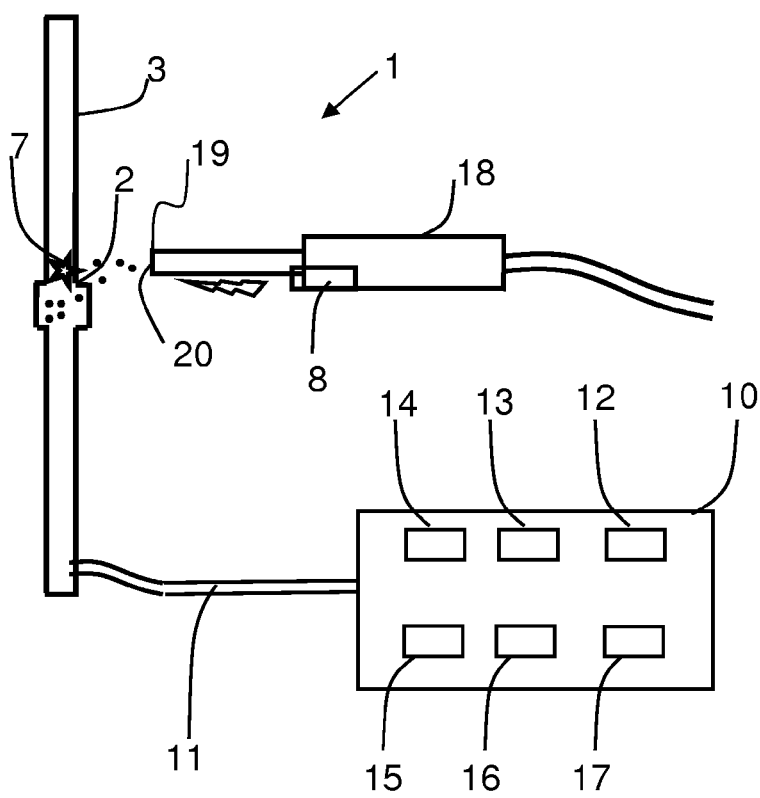
FIG. 4 shows a schematic view of a fourth embodiment of the system according to the invention applied on a test object.

FIG. 4 shows a schematic view of a fourth embodiment of the system 1 according to the invention, which comprises the tracer gas spraying device 18, the marker 7 and the marker detector 8 of the third embodiment of the system 1. However, the fourth embodiment of the system 1 comprises further the base unit 10, which is connectable to the interior of the test object 3 by means of the connection line 11. The base unit 10 of the fourth embodiment corresponds to the base unit 10 of the second embodiment except for the fact that it is connectable to the interior of the test object 3 instead of being connectable to the sniffer probe 4 and that it is arranged to detect tracer gas within the test object 3. Thus, the base unit 10 comprises the vacuum pump 12, the tracer gas sensor 13, the tracer gas measuring unit 14, the time measuring unit 15, the marker counting unit 16 and the test result recording unit 17. Optionally, the system 1 may further comprise a suction flow generating unit (not shown) arranged to generate a suction flow from the interior of the test object 3 to the tracer gas sensor 13. In addition, the fourth embodiment of the system 1 may comprise a fixture and a fixture controller corresponding to those units in the second embodiment. In case the system 1 comprises a fixture, the marker 7 may either be arranged to be attached on the test object 3 or on the fixture at the leakage testing point 2. Optionally, the fixture may then be provided with a special component, such as e.g. an arm or the like, for holding the marker 7 close to the leakage measurement point 2.

In alternatives to the fourth embodiment, the system 1 comprises the tracer gas spraying device 18, the marker 7, the marker detector 8 and at least one of the vacuum pump 12, the tracer gas sensor 13, the tracer gas measuring unit 14, the time measuring device 15, the marker counting unit 16, the test result recording unit 17, the suction flow generating unit, the fixture and the fixture controller.

Thus, while there have been shown and described and pointed out fundamental novel features of the invention as applied to preferred embodiments thereof, it will be understood that various omissions and substitutions and changes in the form and details of the devices, method steps and products illustrated may be made by those skilled in the art. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A system for detection of a leak at a leakage testing point of a test object by a tracer gas, the system comprising:
   a positionable tracer gas mediating unit having a tip;
   a marker being attachable at said leakage testing point; and
   a marker detector being associated with said positionable tracer gas mediating unit, whereby said tip of said tracer gas mediating unit is arranged to be positioned within a predetermined distance interval from said marker during a leak detection test, whereby said marker detector is arranged to detect said marker when said tip is positioned within said predetermined distance interval so as to certify a correct positioning of said tip,
   wherein said marker comprises a radio frequency tag and said marker detector comprises a radio frequency tag reader.

2. The system according to claim 1, wherein said marker comprises a radio frequency identification tag and said marker detector comprises a radio frequency identification tag reader.

3. The system according to claim 1, wherein said tracer gas mediating unit comprises a sniffer probe having a sniffer tip, which comprises a gas inlet orifice arranged to mediate tracer gas into the interior of the sniffer probe.

4. The system according to claim 1, further comprising:
at least one component from the group of a tracer gas supplying device, a vacuum pump, a tracer gas sensor, a tracer gas measuring unit, a time measuring device, a marker counting unit, a test result recording unit, a suction flow generating unit, a leak rate limit setting unit, a fixture and a fixture controller.

5. The system according to claim 1, further comprising:
a fixture, wherein said marker is arranged to be attached on the fixture at the leakage testing point.

6. A system for detection of a leak at a leakage testing point of a test object by a tracer gas, the system comprising:
a positionable tracer gas mediating unit having a tip;
a marker being attachable at said leakage testing point; and
a marker detector being associated with said positionable tracer gas mediating unit, whereby said tip of said tracer gas mediating unit is arranged to be positioned within a predetermined distance interval from said marker during a leak detection test, whereby said marker detector is arranged to detect said marker when said tip is positioned within said predetermined distance interval so as to certify a correct positioning of said tip,
wherein said marker comprises a light reflecting component and said marker detector comprises a light emitting device and a light receiving device,
wherein said light receiving device is configured to determine a distance between said marker detector and said light reflecting component based on a measurement of an intensity of light reflected by said light reflecting component, and
wherein said marker detector is configured to only detect said marker when said tip is positioned within said predetermined distance interval from said marker.

7. A system for detection of a leak at a leakage testing point of a test object by a tracer gas, the system comprising:
a positionable tracer gas mediating unit having a tip;
a marker being attachable at said leakage testing point; and
a marker detector being associated with said positionable tracer gas mediating unit, whereby said tip of said tracer gas mediating unit is arranged to be positioned within a predetermined distance interval from said marker during a leak detection test, whereby said marker detector is arranged to detect said marker when said tip is positioned within said predetermined distance interval so as to certify a correct positioning of said tip,
wherein said marker comprises a magnetic ink and said marker detector comprises a magnetic ink reader.

8. The system according to claim 7, wherein said tracer gas mediating unit comprises a sniffer probe having a sniffer tip, which comprises a gas inlet orifice arranged to mediate tracer gas into the interior of the sniffer probe.

9. The system according to claim 7, further comprising:
at least one component from the group of a tracer gas supplying device, a vacuum pump, a tracer gas sensor, a tracer gas measuring unit, a time measuring device, a marker counting unit, a test result recording unit, a suction flow generating unit, a leak rate limit setting unit, a fixture and a fixture controller.

10. The system according to claim 7, further comprising:
a fixture, wherein said marker is arranged to be attached on the fixture at the leakage testing point.

* * * * *